US009791009B2

(12) United States Patent
Hubbard et al.

(10) Patent No.: US 9,791,009 B2
(45) Date of Patent: Oct. 17, 2017

(54) BRAKE TORQUE MONITORING AND HEALTH ASSESSMENT

(75) Inventors: James L. Hubbard, Kensington, CT (US); Michael Garfinkel, West Hartford, CT (US); Juan Antonio Illan, Las Rozas (ES); Robert D. Shepherd, Goshen, NJ (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 69 days.

(21) Appl. No.: 14/355,128

(22) PCT Filed: Nov. 2, 2011

(86) PCT No.: PCT/US2011/058885
§ 371 (c)(1),
(2), (4) Date: Apr. 29, 2014

(87) PCT Pub. No.: WO2013/066321
PCT Pub. Date: May 10, 2013

(65) Prior Publication Data
US 2014/0311257 A1    Oct. 23, 2014

(51) Int. Cl.
*G01L 3/18*     (2006.01)
*F16D 66/00*    (2006.01)
*G01L 5/28*     (2006.01)
*B60T 7/18*     (2006.01)
*B66B 5/00*     (2006.01)

(52) U.S. Cl.
CPC ............ *F16D 66/00* (2013.01); *B66B 5/0037* (2013.01); *G01L 5/28* (2013.01); *B60T 7/18* (2013.01); *B66B 5/00* (2013.01); *F16D 2066/005* (2013.01)

(58) Field of Classification Search
CPC . B66B 5/0037; F16D 2066/005; F16D 66/00; G01L 5/28; B60T 7/18
USPC ................................ 73/760, 862.08, 862.12
See application file for complete search history.

(56) References Cited

U.S. PATENT DOCUMENTS

| 5,025,896 | A  | * | 6/1991  | Arabori et al. ............... 187/292 |
| 6,196,355 | B1 | * | 3/2001  | Fargo et al. .................. 187/393 |
| 6,488,128 | B1 | * | 12/2002 | Slabinski ...................... 187/393 |
| 2006/0175153 | A1 | | 8/2006 | Hubbard et al. |
| 2008/0185231 | A1 | | 8/2008 | Osterman et al. |
| 2010/0154527 | A1 | | 6/2010 | Illan |

(Continued)

FOREIGN PATENT DOCUMENTS

CN    101243000 A    8/2008
CN    100475678 C    4/2009

(Continued)

OTHER PUBLICATIONS

International Search Report and Written Opinion for related International Application No. PCT/US11/58885; report dated Jun. 28, 2012.

(Continued)

*Primary Examiner* — Max Noori
(74) *Attorney, Agent, or Firm* — Cantor Colburn LLP

(57) ABSTRACT

A method for monitoring brake torque of an elevator having a motor is provided. The method may engage an elevator brake for a predefined duration, determine a displacement of an output shaft of the motor during the predefined duration, and generate an alert if the displacement exceeds a predefined threshold.

17 Claims, 6 Drawing Sheets

(56) References Cited

U.S. PATENT DOCUMENTS

2010/0187047 A1* 7/2010 Gremaud et al. ............. 187/351
2011/0303493 A1* 12/2011 Hubbard et al. ............. 187/254

FOREIGN PATENT DOCUMENTS

| | | |
|---|---|---|
| CN | 101589300 A | 11/2009 |
| CN | 101786566 A | 7/2010 |
| JP | H01288590 A | 11/1989 |
| JP | 2006502933 A | 1/2006 |
| JP | 2008-222358 A | 9/2008 |
| JP | 2009-137707 A | 6/2009 |
| JP | 2009526723 A | 7/2009 |
| JP | 2010168172 A | 8/2010 |
| WO | 2007094777 A2 | 8/2007 |

OTHER PUBLICATIONS

European Search Report for related European Application No. 11875161.9; report dated May 26, 2015.
Chinese First Office Action and Search report for application CN 201180076188.2, dated Jul. 1, 2015, 7 pages.
Japanese Office Action for application JPA 2014-539912, dated Feb. 19, 2016, 8 pages.

\* cited by examiner

BRAKE TORQUE MONITORING AND HEALTH ASSESSMENT

CROSS-REFERENCE TO RELATED APPLICATIONS

This application is a U.S. national stage filing under 35 USC §371 of International Patent Application No. PCT/US11/58885 filed on Nov. 2, 2011.

FIELD OF THE DISCLOSURE

The present disclosure generally relates to elevator brakes, and more particularly, to monitoring the health of machine brakes and emergency brakes in elevators.

BACKGROUND OF THE DISCLOSURE

In general, elevator cars in a machine roomless configuration are driven vertically through a hoistway by an electric motor and one or more elevator brakes that are supported by a bedplate and positioned within an upper portion of the hoistway. In alternative configurations, the electric motor and the associated brakes may be provided within a separate machine room rather than within the hoistway. Operation of the motor rotates an output shaft as well as a traction sheave coupled thereto. Tensile members, such as belts, ropes, cables, and the like, connecting the elevator car to a counterweight are at least partially fitted about the traction sheave. As the motor rotates the traction sheave, the tensile members are caused to travel around the traction sheave, and thus, lift or lower the elevator car within the hoistway to a desired floor or landing.

The motor of a typical elevator system is used to slow the elevator car as the car approaches a desired landing while one or more elevator brakes are used to hold the car at the landing as passengers load or unload the car. Elevators may also employ emergency brakes configured to automatically engage in the event of a malfunction, a power outage, or any other emergency situation. Elevator brakes may mechanically and/or frictionally engage a rotor, a drum, or the like, so as to resist rotation of the output shaft and the traction sheave and to prevent further travel of the elevator car. The capacity of the elevator brake to sufficiently slow and hold a moving elevator car may be gauged by its brake torque.

The brake torque of an elevator brake may be sufficiently rated according to the particular design or application of the elevator, the specifications of the elevator drive system, and other considerations. The brake torque of an elevator brake must additionally be sufficiently rated to produce the minimum level of torque required by regional and/or universal safety codes and regulations. Due to the mechanical nature of elevator brakes, however, the braking capacity or brake torque supplied by an elevator brake may change with time. The brake torque may decrease due to several factors. For example, the coefficient of friction between the brake and the rotor or drum may decrease due to oxidation, moisture, and the like. The normal forces of springs or dampers in elevator brakes used to exert friction may also decrease due to natural relaxation. Furthermore, misalignments and/or malfunctions may occur over time, causing the brake to drag and reducing overall braking capacity.

Currently, the health condition of elevator brakes is manually and periodically inspected by maintenance service personnel. Based on the results of the inspection, brakes may be repaired/replaced or disregarded until at least the next inspection due. While regularly conducted maintenance may serve as an adequate safety measure, current inspection techniques lack a more efficient way to quantify the braking capacity of a brake and to track the braking capacity over time. Furthermore, Furthermore, with the increasing number of machine roomless elevator installations, in which the elevator brakes are positioned within the hoistway rather than in a separate machine room, it is becoming even more difficult to safely access and inspect elevator brakes on a regular basis.

SUMMARY OF THE DISCLOSURE

In accordance with one aspect of the disclosure, a method for monitoring brake torque of an elevator having a motor is provided. The method may engage a machine brake of the elevator for a predefined duration, determine a displacement of an output shaft of the motor during the predefined duration, and generate an alert if the displacement exceeds a predefined threshold.

In a refinement, the machine brake may be configured such that disengaging the machine brake automatically engages an emergency brake and disengaging the emergency brake automatically engages the machine brake.

In another refinement, the method may further engage an emergency brake of the elevator for a predefined duration, determine a displacement of the output shaft during the predefined duration, and generate an automatic alert if the displacement exceeds the predefined threshold.

In another refinement, the steps of engaging the brake and determining the displacement of the output shaft may be repeated two or more times prior to generating alerts.

In another refinement, an elevator car of the elevator may be raised to an uppermost landing prior to engaging the brake.

In yet another refinement, the method may further determine a minimum motor current required to drive an output shaft of the motor through the brake while engaging the brake, compute a baseline brake torque based at least partially on the minimum motor current, periodically monitor the brake torque for any significant decrease as compared with the baseline brake torque, and generate an alert if a subsequently computed brake torque is determined to be less than a predefined fraction of the baseline brake torque.

In accordance with another aspect of the disclosure, a method for monitoring at least one brake of an elevator having a motor is provided. The method may engage the brake and determine a minimum motor current required to drive an output shaft of the motor through the engaged brake during a brake calibration, apply a test motor current to the motor while engaging the brake during a brake test, determine a displacement of the output shaft, and generate an alert if the displacement exceeds a predefined threshold. The test motor current may be a fraction of the minimum motor current.

In a refinement, the brake calibration and the brake test may be performed for each of a machine brake and an emergency brake of the elevator.

In another refinement, an elevator car of the elevator may be raised to an uppermost landing prior to performing the brake calibration and the brake test.

In another refinement, the brake test may be performed at predefined intervals.

In yet another refinement, the method may further compute a baseline brake torque based at least partially on the minimum motor current, periodically monitor the brake torque for any significant decrease as compared with the baseline brake torque, and generate an alert if a subsequently computed brake torque is determined to be less than a predefined fraction of the baseline brake torque.

In accordance with yet another aspect of the disclosure, a brake monitoring system for an elevator is provided. The brake monitoring system may include a motor having an output shaft, an encoder configured to detect displacement of the output shaft, at least one brake configured to selectively engage the output shaft, and a controller in communication with each of the motor, the encoder, and the brake. The controller may be configured to engage the brake and determine a minimum motor current required to drive the output shaft through the engaged brake during a brake calibration, apply a test motor current being a fraction of the minimum motor current to the motor during a brake test, monitor the encoder for any displacement of the output shaft, and generate an alert if the displacement exceeds a predefined threshold.

In a refinement, the elevator may include a machine brake and an emergency brake, and the controller may be configured to perform the brake calibration and the brake test for each of the machine brake and the emergency brake.

In another refinement, the controller may compute a baseline brake torque based at least partially on the minimum motor current, and periodically monitor the brake torque for any significant decrease as compared with the baseline brake torque.

In a related refinement, the controller may generate an alert if a subsequently computed brake torque is determined to be less than a predefined fraction of the baseline brake torque.

In another related refinement, the controller may periodically communicate the baseline brake torque and subsequently computed brake torques to a remote monitoring facility.

In yet another related refinement, the controller may compute the baseline brake torque further based on parameters associated with one or more of duty load, counterweight, tensile members, traction sheave and the motor.

In another refinement, the controller may repeat each brake test two or more times in order to confirm a passed or a failed brake test.

In another refinement, the controller may resume normal operation when no alerts are generated and cease normal operation when at least one alert is generated.

In another refinement, the controller may generate the alert using one or more of an audible alarm, a visual alarm, and an electronic error message.

These and other aspects of this disclosure will become more readily apparent upon reading the following detailed description when taken in conjunction with the accompanying drawings.

Figure 1:
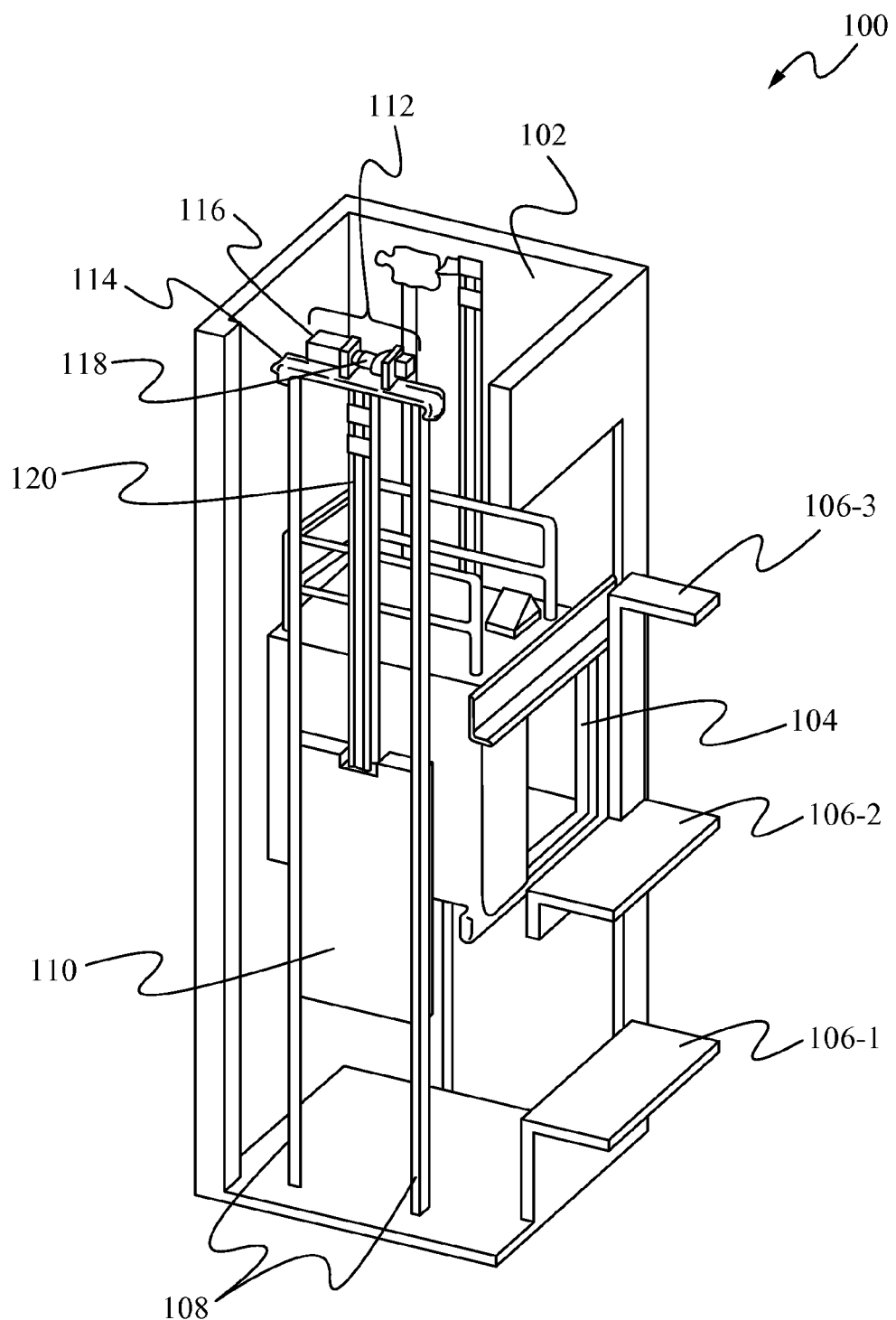
FIG. 1 is a partial perspective view of an elevator.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring now to FIG. 1, a schematic diagram of an exemplary elevator system 100 is provided. It is to be understood that the version of the elevator system 100 shown in FIG. 1 is for illustrative purposes only and to present background for some of the various components of a general elevator system. Other components of an elevator system unnecessary for an understanding of the present disclosure are not described.

As shown in FIG. 1, the elevator system 100 may reside fully or partially in a hoistway 102 that is vertically disposed within a building. The hoistway 102 may generally include a hollow shaft provided within a central portion of the building with multiple hoistways being provided if the building is of sufficient size and includes multiple elevators. Moreover, the hoistway 102 may provide a vertical path through which an elevator car 104 may travel between floors or landings 106 of the building. Additionally, rails 108 may extend substantially the length of the hoistway 102, along which the elevator car 104 as well as counterweights 110 may be slidably mounted. While not depicted in detail, one of ordinary skill in the art will understand that both the elevator car 104 and the counterweight 110 may further include rollers, slide guides, or the like, that slidably engage the rails 108 in a secure fashion so as to provide for smooth motion of the car 104 and/or counterweight 110 along the rails 108.

Vertical movement of the elevator car 104 may be driven by a machine 112 of the elevator system 100. As shown, the machine 112 may be supported by a bedplate 114 that is located within an upper portion of the hoistway 102. The machine 112 may be a gearless traction machine essentially including an electric motor 116 and a traction sheave 118 coupled thereto. Tensile members 120, such as belts, ropes, cables, and the like, connected between the elevator car 104 and the counterweights 110 may be partially fitted over the traction sheave 118. As the motor 116 rotates the traction sheave 118, the tensile members 120 may be caused to lift or lower the elevator car 104 to the desired floor or landing 106.

Figure 2:
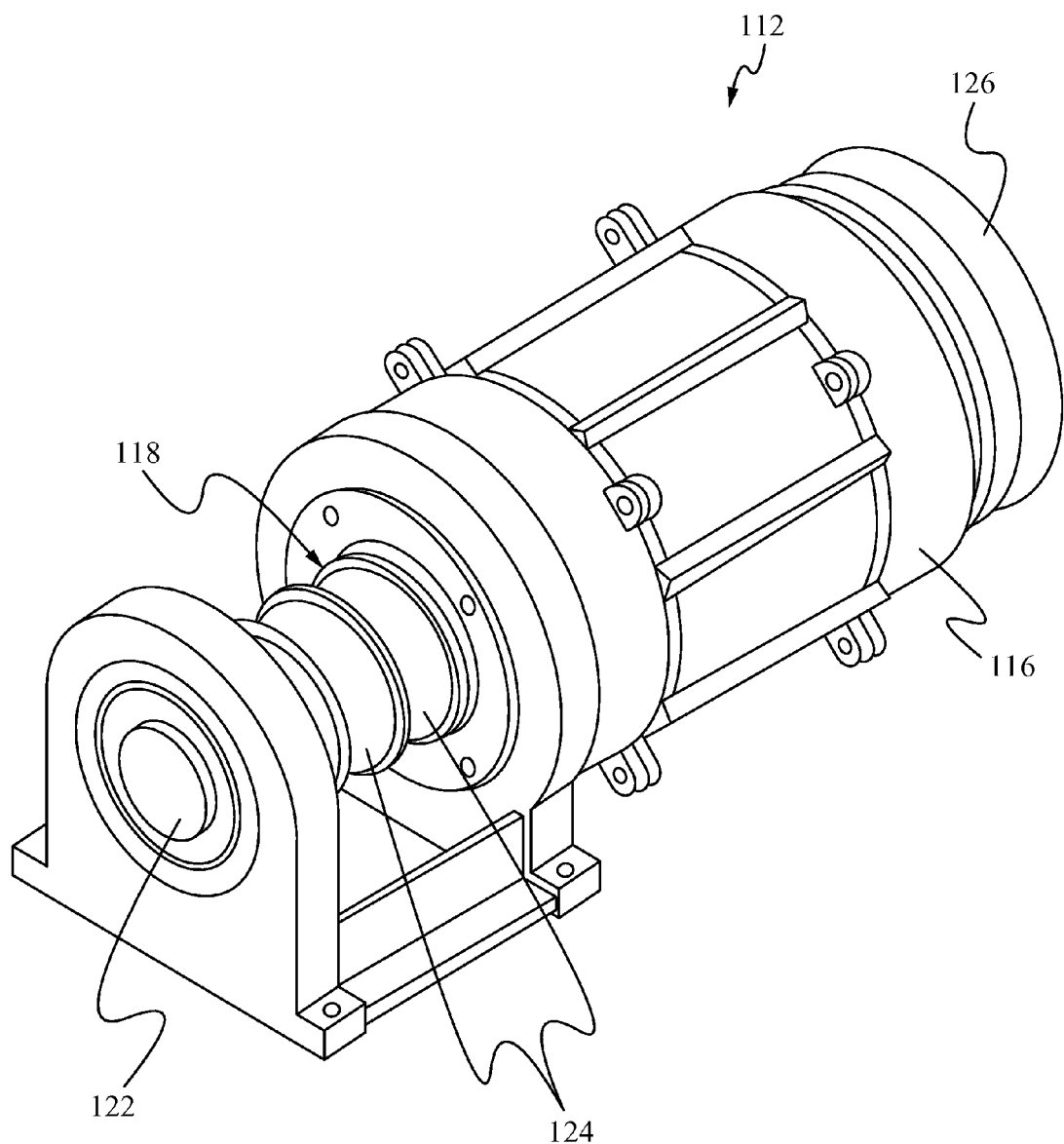
FIG. 2 is a partial perspective view of a drive machine of an elevator.

Turning now to FIG. 2, one exemplary embodiment of the machine 112 is provided in more detail. As shown, the machine 112 may be provided with a motor 116 having an output shaft 122 extending from the proximal end thereof. The output shaft 122 may be coupled to and extended through the traction sheave 118. The exterior surface of the traction sheave 118 may include grooves 124 configured to receive one or more tensile members 120. The direction and speed of rotation of the traction sheave 118 and the output shaft 122 may be selectively adjusted by the motor 116. The motor 116 may receive input corresponding to the direction and degree of motion to be output from a central controller and other related electronics, which may be located on the bedplate 114, within a machine room (not shown), or the like. The machine 112 may further be provided with one or more brakes 126, for example, machine brakes 126-1 and emergency brakes 126-2, which may be positioned at a distal end of the motor 116. The brakes 126 may include a rotor or a drum type configuration which employs friction to slow the rotation of the output shaft 122, and thus, hold the associated elevator car 104 at a desired landing 106. Machine brakes 126-1 may be selectively engaged in response to input from the central controller. Emergency brakes 126-2 may be configured so as to automatically engage and stop any rotation of the output shaft 122 in response to a malfunction, power outage, or the like, thus preventing further travel of the elevator car 104.

Figure 3:
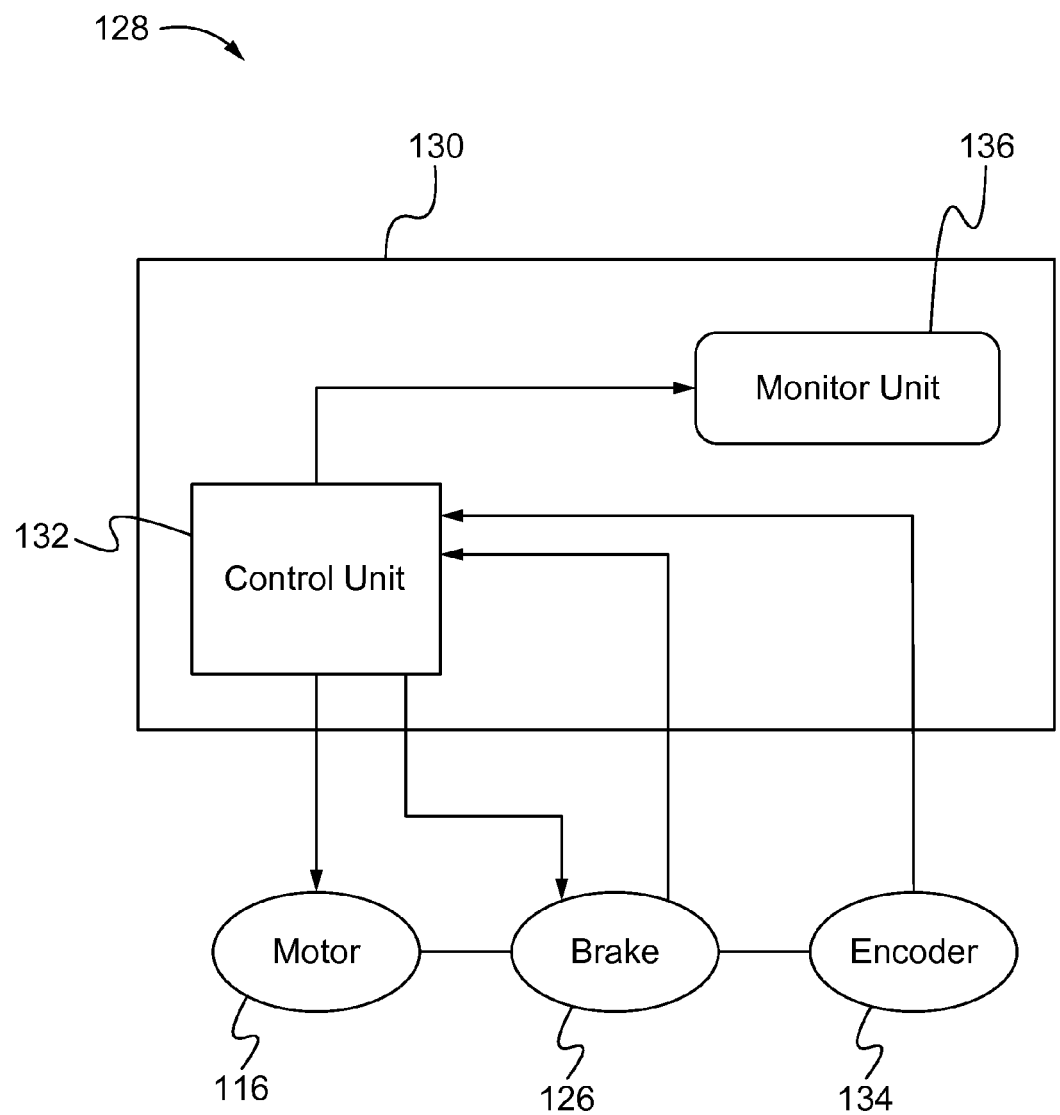
FIG. 3 is a schematic view of one exemplary brake monitoring and health assessment system constructed in accordance with the teaching of the disclosure.

Referring to FIG. 3, a schematic of one exemplary brake monitoring and health assessment system 128 that may be used in conjunction with the machine 112 of FIG. 2 is provided. As shown, the brake monitoring system 128 may include a central controller 130 having at least a control unit 132 that is in communication with each of the motor 116 and the brakes 126 of the elevator 100. The controller 130 or the control unit 132 may also be in communication with an encoder 134 of the machine 112. Specifically, the encoder 134 may be disposed proximate the output shaft 122 and the motor 116, and configured to electrically communicate to the control unit 132 feedback information corresponding to the position and/or speed of rotation of the output shaft 122. The control unit 132 may further communicate with a monitor unit 136. As shown in FIG. 3, for example, the monitor unit 136 may be located onboard or in proximity to the controller 130. In alternative embodiments, the monitor unit 136 may be remotely situated, for example, at a remote monitoring facility, machine room, or the like, and configured to communicate with the control unit 132 over a wired and/or wireless network. The controller 130 of FIG. 3 may employ a processor, microprocessor, microcontroller, or any other suitable electronic device for performing functions necessary for monitoring and assessing the health condition of the elevator brakes 126. The controller 130 may also include a memory upon which an algorithm or a method of executable steps may be preprogrammed.

Figure 4:
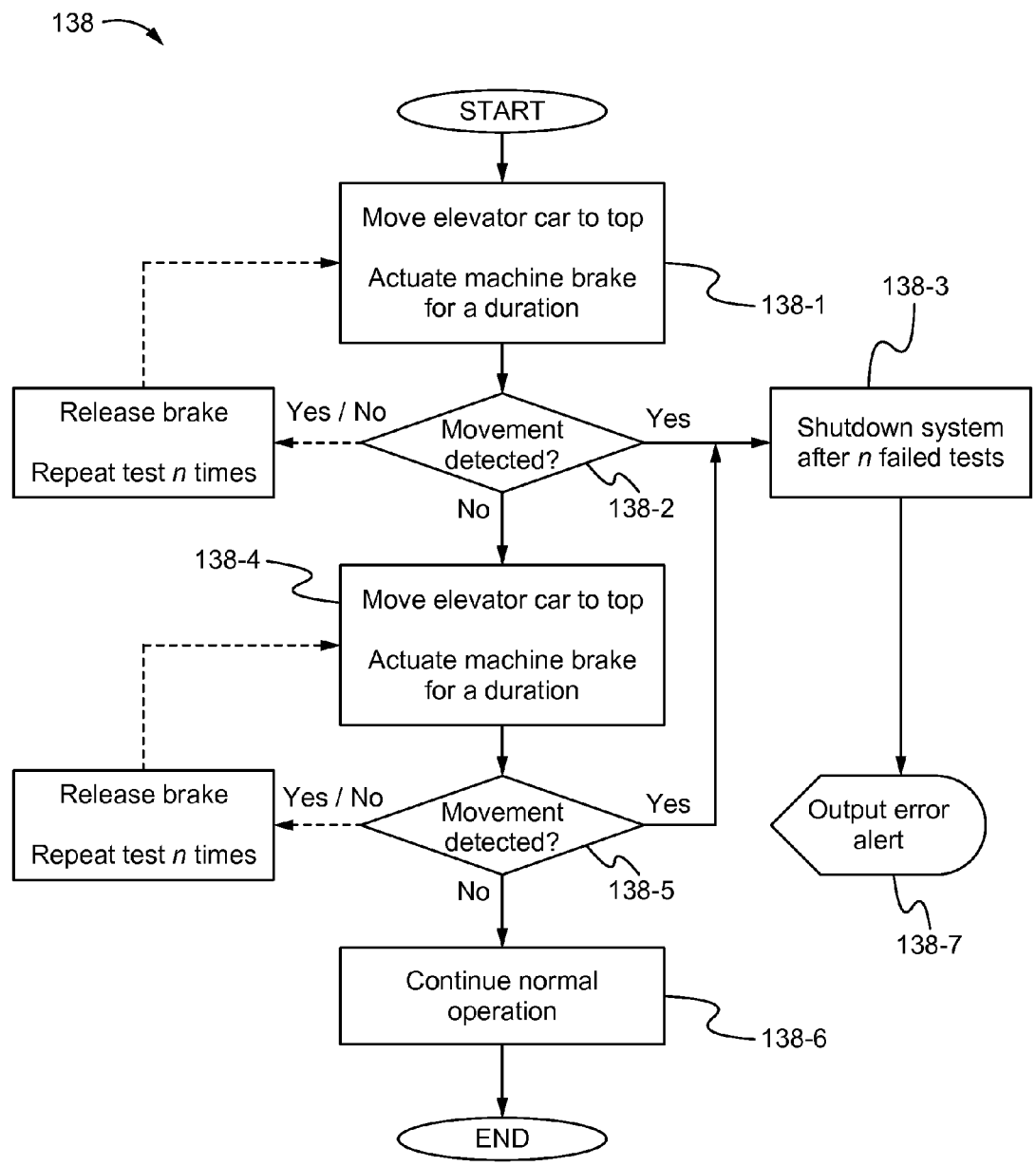
FIG. 4 is a diagrammatic view of one exemplary algorithm for monitoring and assessing the health of elevator brakes.

The diagram of FIG. 4 illustrates one exemplary algorithm or method 138 by which the controller 130 of the brake monitoring system 128 may monitor and assess the health of each of the elevator brakes 126. As an initial step 138-1 and prior to assessing the health of the brakes 126, the controller 130 may be configured to raise an elevator car 104 while empty to an uppermost landing 106-3 so as to provide a consistent and sufficient load for assessing the brakes 126. During normal operating conditions, the controller 130, by default, may be configured to engage both first and second brakes 126, for example, the machine brake 126-1 and the emergency brake 126-2, while holding the elevator car 104 at any particular landing 106. However, when performing the assessment according to the method 138 of FIG. 4 and while holding the elevator car 104 at the uppermost landing 106-3, for example, the controller 130 may engage only a first brake, or the machine brake 126-1, and disengage a counterpart second brake 126, or the emergency brake 126-2, so as to isolate the assessment to only the machine brake 126-1. In step 138-2, the controller 130 may maintain the machine brake 126-1 in the engaged state and the emergency brake 126-2 in the disengaged state for a predefined duration, during which the controller 130 may monitor for any vertical movement or displacement of the elevator car 104. For example, while engaging the machine brake 126-1, the encoder 134 may communicate electronic pulses to the controller 130 corresponding to any rotational displacement that may be detected at the output shaft 122 of the machine 112, indicative of vertical movement of the elevator car 104.

With the machine brake 126-1 engaged and the emergency brake 126-2 disengaged, the controller 130 may be configured to compare the number of observed pulses with a threshold or a predefined number of pulses. For example, if the number of observed pulses is within the allowable threshold, corresponding to minimal movement of the elevator car 104, the controller 130 may deem the condition of the machine brake 126-1 as acceptable. Alternatively, if the number of observed pulses exceeds the predefined threshold, corresponding to excess movement or slipping of the elevator car 104, the controller 130 may deem the condition of the machine brake 126-1 as faulty. Additionally, the controller 130 may repeat the brake test, for instance, steps 138-1 and 138-2, two or more times in order to further verify the condition of the machine brake 126-1. For example, upon determining the results of a first brake test, the controller 130 may release the machine brake 126-1, such that both the machine brake 126-1 and the elevator brake 126-2 are disengaged, and return the elevator car 104 to the uppermost landing 106-3 for additional testing. In such a manner, the controller 130 may repeat the brake test, steps 138-1 and 138-2, until a substantially conclusive assessment is achieved.

If during step 138-2 the controller 130 observes two or more consecutive failures indicative of a faulty machine brake 126-1, the controller 130 may be configured to shut down the elevator system 100, as shown in step 138-3 of FIG. 4. However, if during step 138-2 the controller 130 observes two or more consecutive results indicative of a healthy machine brake 126-1, the controller 130 may then proceed to isolate the emergency brake 126-2 and assess the health thereof in step 138-4. For instance, the controller 130 may disengage the machine brake 126-1 and engage the emergency brake 126-2 so as to hold the elevator car 104 in place for a predefined duration of time. As in step 138-2, the controller 130 in step 138-5 may observe feedback from the encoder 134 to determine any signs of significant vertical displacement or slipping of the elevator car 104. Similar to the machine brake tests, the controller 130 may additionally repeat the emergency brake test, for instance, steps 138-4 and 138-5, two or more times in order to further verify the condition of the emergency brake 126-2. If the brake test in step 138-5 results in two or more consecutive indications of a healthy emergency brake 126-2, the controller 130 may resume normal operation of the elevator system 100 in step 138-6. Alternatively, if the brake test in step 138-5 results in two or more consecutive failures indicative of a faulty emergency brake 126-2, the controller 130 may be configured to shut down the elevator system 100 in step 138-3.

Accordingly, if any of the machine or emergency brakes 126 is confirmed faulty, the controller 130 may proceed to shut down the elevator system 100 in step 138-3. In an optional step 138-7, the controller 130 may further be configured to output an alert to indicate the fault and to call attention to maintenance personnel, or the like. The alert may take form of an audible alarm, a visual alarm, an electronic error message on a display screen, an electronic notification communicated to a computer or a mobile device, or the like. The alert may also be transmitted over a network and to a remote monitoring facility where dispatch personnel may respond accordingly.

Figure 5:
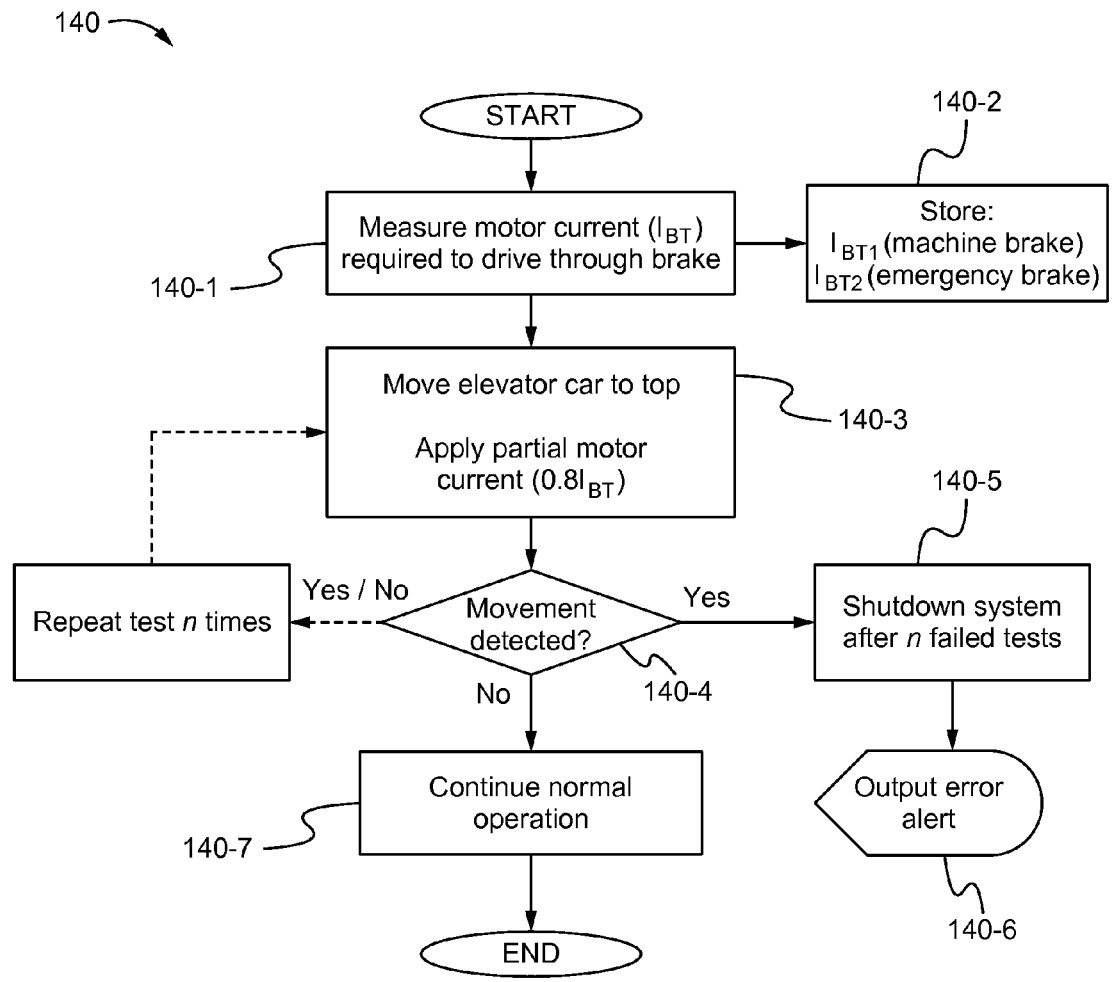
FIG. 5 is a diagrammatic view of another exemplary algorithm for monitoring and assessing the health of elevator brakes.

The diagram of FIG. 5 illustrates another exemplary algorithm or method 140 by which the controller 130 may monitor and assess the health of an elevator brake 126. In an initial brake calibration step 140-1, the controller 130 may raise the elevator car 104 to an uppermost landing 106-3 and engage the elevator brake 126. The controller 130 may further determine a minimum motor current required to drive the motor 116 or output shaft 122 through the brake 126. Moreover, while the brake 126 is engaged, the controller 130 may gradually increase the motor current, and thus the output torque of the motor 116, so as to determine the minimum motor current that is needed to drive through the engaged brake 126. The output torque of the motor 116 corresponding to the minimum motor current may be observed as the baseline brake torque of the brake 126. In a further step 140-2, the controller 130 may retrievably store the resulting minimum motor current value, and/or the corresponding baseline brake torque value, in a memory located on-site and/or off-site to be used as reference in subsequent brake tests. The algorithm or method 140 of FIG. 5 may also be used in conjunction with elevator systems 100 having more than one elevator brake 126, including for example, a machine brake 126-1 and an emergency brake 126-2. Specifically, the controller 130 may similarly perform the brake calibration steps 140-1 and 140-2 on each of the machine brake 126-1 and the emergency brake 126-2, and retrievably store the corresponding minimum motor current values, and/or the baseline brake torque values, in a memory.

Once calibration is complete and the controller 130 has at least one baseline current or torque value stored for reference, the controller 130 may initiate a brake test in step 140-3. As in previous embodiments, the controller 130 may first engage the elevator brake 126 and hold the elevator car 104 at an uppermost landing 106-3 for a predefined duration. While engaging the brake 126, the controller 130 may source a test motor current to the motor 116. The test motor current may be a predefined fraction, for example, approximately 80%, of the minimum motor current observed in step 140-1. In step 140-4, the controller 130 may be configured to determine the amount of displacement, if any, which occurs in response to applying the test motor current while the brake 126 is engaged. The controller 130 may determine displacement by measuring a change in the vertical position of the elevator car 104 or its associated tensile members 120. Alternatively, the controller 130 may determine displacement by measuring a change in the angular position of the traction sheave 118 or the output shaft 122 using, for example, an encoder 134, or the like. The controller 130 may additionally repeat the brake test, steps 140-3 and 140-4, two or more times in order to further verify the health of the brake 126.

If the detected displacement exceeds a predefined maximum threshold for two or more consecutive brake tests, the controller 130 may deem the brake 126 as faulty or requiring maintenance and proceed to step 140-5. Specifically, the controller 130 may shut down the elevator system 100 in step 140-5, and optionally, the controller 130 may further generate an alert indicating the fault in step 140-6. The alert may take form of an audible alarm, a visual alarm, an electronic error message on a display screen, an electronic notification communicated to a computer or a mobile device, or the like. The alert may also be transmitted over a network and to a remote monitoring facility where dispatch personnel may respond accordingly. Alternatively, if the detected displacement is within the allowed threshold for two or more consecutive brake tests, the controller 130 may deem the brake 126 as functional and resume normal operation of the elevator 100 in step 140-7. In configurations with multiple elevator brakes 126, for example, machine brakes 126-1 and emergency brakes 126-2, the controller 130 may be similarly configured to conduct the brake test, steps 140-3 and 140-4, and assess the health of each of the machine brake 126-1 and the emergency brake 126-2.

Figure 6:
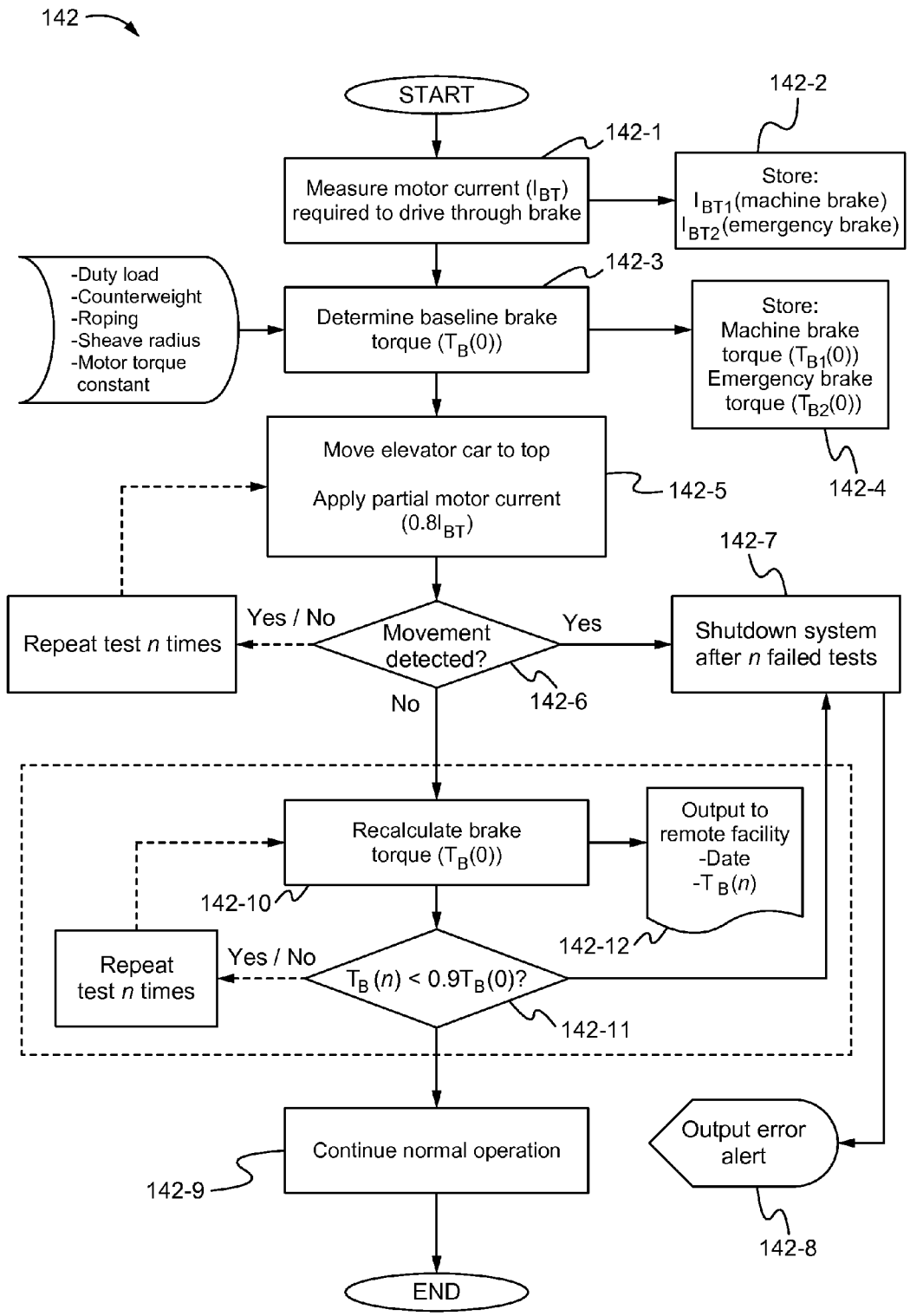
FIG. 6 is a diagrammatic view of yet another exemplary algorithm for monitoring and assessing the health of elevator brakes.

Turning now to FIG. 6, yet another exemplary algorithm or method 142 by which the controller 130 may monitor and assess the health of an elevator brake 126 is provided. As in the brake calibration of FIG. 5, the controller 130 may engage the brake 126 and determine the minimum motor current that is required to drive the motor 116 through the engaged brake 126 in step 142-1. In particular, while the brake 126 is engaged, the controller 130 may gradually increase the motor current and the output torque of the motor 116 until the torque overpowers the engaged brake 126. The minimum motor current observed may then be retrievably stored in a memory in step 142-2. Once the minimum motor current is obtained, the controller 130 may compute the corresponding baseline brake torque in step 142-3. More specifically, the controller 130 may calculate the baseline brake torque of the brake 126 based at least partially on the minimum motor current obtained in step 142-1. In computing the baseline brake torque, the controller 130 may additionally employ parameters associated with, for example, the duty load, specifications of the counterweights 110, specifications of the tensile members 120, the radius of the traction sheave 118, the torque constant of the motor 116, and the like. The resulting baseline brake torque may then be retrievably stored in a memory that is accessible by the controller 130 in step 142-4. As in the method 140 of FIG. 5, the algorithm or method 142 of FIG. 6 may be applied to elevator systems 100 having more than one elevator brake 126, for example, a machine brake 126-1 and an emergency brake 126-2. Moreover, the controller 130 may perform the brake calibration on both the machine brake 126-1 as well as the emergency brake 126-2 in order to determine the corresponding minimum motor currents and the baseline brake torques.

Still referring to FIG. 6, once the brake calibration steps 142-1 and 142-3 have been performed for one or more of the elevator brakes 126, the controller 130 may initiate a brake test in step 142-5. Specifically, the controller 130 may raise the elevator car 104 to an uppermost landing 106-3 of the hoistway and engage the brake 126 for a predefined duration. While the brake 126 is engaged, the controller 130 may apply a test motor current to the motor 116. The test motor current may be a predefined fraction, for example, approximately 80%, of the minimum motor current observed in step 142-1. In step 142-6, the controller 130 may be configured to determine the amount of displacement, if any, which occurs in response to applying the test motor current with the brake 126 engaged. The controller 130 may determine displacement by measuring a change in the vertical position of the elevator car 104 or its associated tensile members 120. The controller 130 may alternatively determine displacement by measuring a change in the angular position of the traction sheave 118 or the output shaft 122 using, for example, an encoder 134, or the like. The controller 130 may repeat the brake test, steps 142-5 and 142-6, two or more times in order to further verify the condition of the brake 126.

If the detected displacement exceeds a predefined maximum threshold for two or more consecutive brake tests, the controller 130 may deem the brake 126 as faulty or requiring maintenance and proceed to step 142-7. Specifically, the controller 130 may shut down the elevator system 100 and additionally generate an alert indicating the fault in step 142-8. The alert may take form of an audible alarm, a visual alarm, an electronic error message on a display screen, an electronic notification communicated to a computer or a mobile device, or the like. The alert may also be transmitted over a network and to a remote monitoring facility where dispatch personnel may respond accordingly. If the detected displacement is within the maximum threshold for two or more consecutive brake tests, the controller 130 may deem the brake 126 as functional and resume normal operation of the elevator 100 in step 142-9. In applications involving more than one elevator brake 126, for instance, having machine brakes 126-1 and emergency brakes 126-2, the controller 130 may be configured to conduct the brake test, steps 142-5 and 142-6, and assess the health of each of the machine brake 126-1 and the emergency brake 126-2.

According to the algorithm or method 142 of FIG. 6, the controller 130 may optionally be configured to automatically or manually via remote control conduct periodic health checks of an elevator brake 126. As shown in step 142-10, the controller 130 may be configured to periodically recalculate the brake torque of the brake 126 so as to determine the absolute decrease in braking capacity as compared with the initial baseline brake torque determined during calibration steps 142-1 and 142-3. For example, the controller 130 may engage the brake 126 and gradually increase the motor current, and thus the output torque of the motor 116, to determine the minimum motor current needed to drive the output shaft 122 through the brake 126. Once the minimum motor current is acquired, the controller 130 may then perform the similar computations as conducted in step 142-3 to determine an updated brake torque value for the brake 126. In step 142-11, the controller 130 may compare the newly observed brake torque value with the baseline brake torque value previously determined in step 142-3 to assess the decrease in braking capacity of the brake 126 since the initial calibration. For example, the controller 130 may assess whether the updated brake torque is less than a predefined fraction, such as 90%, or the like, of the baseline brake torque value. The assessment may also be repeated two or more times to more precisely gauge the loss in brake torque.

If the assessment reveals a substantial loss in brake torque and an inadequate brake 126, the controller 130 may shut down the elevator system 100 in step 142-7 and generate the appropriate alert in step 142-8. Alternatively, if the assessment reveals some loss in brake torque that is still within acceptable limits, the controller 130 may resume normal operation of the elevator 100. In an optional step 142-12, the controller 130 may further communicate the newly observed brake torque values corresponding to each brake 126 to a remote monitoring facility, or the like, where successively observed brake torque values per installed elevator unit may be stored and monitored. Furthermore, in applications having more than one brake 126, for example, in configurations having machine brakes 126-1 and emergency brakes 126-2, the routines or subroutines of FIG. 6 may be repeated so as to assess the health of each machine brake 126-1 and each emergency brake 126-2.

INDUSTRIAL APPLICABILITY

The brake health assessment methods and systems disclosed herein may be used in a wide range of industrial or commercial applications, such as with brakes in elevator systems. Enabling automatic and periodic assessment of elevator brakes significantly facilitates the task of inspecting elevator brakes while ensuring more consistent compliance with elevator safety codes and regulations. Brake inspections in machine roomless configurations are made even more advantageous because maintenance personnel are not required to access the hoistway as often. Computing the baseline brake torque of an elevator brake provides a quantifiable and consistent point of reference with which to gauge the health of each elevator brake over time. Furthermore, communicating and storing observed brake torque values at an on-site and/or off-site monitoring facility enables maintenance personnel to more intuitively and readily assess the health of each elevator brake. By tracking such data, preventative maintenance and/or repair may also be scheduled and performed more efficiently while reducing safety risks.

While only certain embodiments have been set forth, alternatives and modifications will be apparent from the above description to those skilled in the art. These and other alternatives are considered equivalents and within the spirit and scope of this disclosure.

What is claimed is:

1. A method for monitoring brake torque of an elevator having a motor, the method comprising:
engaging an elevator brake;
determining a minimum motor current required to drive an output shaft of the motor through the brake while engaging the brake;
computing a baseline brake torque based at least partially on the minimum motor current;
periodically monitoring the brake torque for any significant decrease as compared with the baseline brake torque; and
generating an alert if a subsequently computed brake torque is determined to be less than a predefined fraction of the baseline brake torque.

2. The method of claim 1, wherein the elevator brake is a machine brake.

3. The method of claim 1, wherein an elevator car of the elevator is raised to an uppermost landing prior to engaging the brake.

4. A method for monitoring at least one brake of an elevator having a motor, the method comprising:
during a brake calibration, engaging the brake and determining a minimum motor current required to drive an output shaft of the motor through the engaged brake;
during a brake test, applying a test motor current to the motor while engaging the brake, the test motor current being a fraction of the minimum motor current;
determining a displacement of the output shaft; and
generating an alert if the displacement exceeds a predefined threshold.

5. The method of claim 4, wherein the elevator includes a machine brake and an emergency brake, the brake calibration and the brake test being performed for each of the machine brake and the emergency brake of the elevator.

6. The method of claim 4, wherein an elevator car of the elevator is raised to an uppermost landing prior to performing the brake calibration and the brake test.

7. The method of claim 4, wherein the brake test is performed at predefined intervals.

8. The method of claim 4 further comprising:
computing a baseline brake torque based at least partially on the minimum motor current;
periodically monitoring the brake torque for any significant decrease as compared with the baseline brake torque; and
generating an alert if a subsequently computed brake torque is determined to be less than a predefined fraction of the baseline brake torque.

9. A brake monitoring system for an elevator, the brake monitoring system comprising:
- a motor having an output shaft;
- an encoder configured to detect displacement of the output shaft;
- at least one brake configured to selectively engage the output shaft;
- a controller in communication with each of the motor, the encoder, and the brake, the controller configured to engage the brake and determine a minimum motor current required to drive the output shaft through the engaged brake during a brake calibration, apply a test motor current being a fraction of the minimum motor current to the motor during a brake test, monitor the encoder for any displacement of the output shaft, and generate an alert if the displacement exceeds a predefined threshold.

10. The system of claim 9, wherein the elevator includes a machine brake and an emergency brake, the controller being configured to perform the brake calibration and the brake test for each of the machine brake and the emergency brake.

11. A brake monitoring system for an elevator, comprising:
- a motor having an output shaft;
- an encoder configured to detect displacement of the output shaft;
- at least one brake configured to selectively engage the output shaft;
- a controller in communication with each of the motor, the encoder, and the brake, the controller configured to engage the brake and determine a minimum motor current required to drive the output shaft through the engaged brake during a brake calibration, apply a test motor current being a fraction of the minimum motor current to the motor during a brake test, monitor the encoder for any displacement of the output shaft, and generate an alert if the displacement exceeds a predefined threshold;
- wherein the controller computes a baseline brake torque based at least partially on the minimum motor current, and periodically monitors the brake torque for any significant decrease as compared with the baseline brake torque.

12. The system of claim 11, wherein the controller generates an alert if a subsequently computed brake torque is determined to be less than a predefined fraction of the baseline brake torque.

13. The system of claim 11, wherein the controller periodically communicates the baseline brake torque and subsequently computed brake torques to a remote monitoring facility.

14. The system of claim 11, wherein the controller computes the baseline brake torque further based on parameters associated with one or more of duty load, counterweight, tensile members' traction sheave and the motor.

15. The system of claim 9, wherein the controller repeats each brake test two or more times in order to confirm a passed or a failed brake test.

16. The system of claim 9, wherein the controller resumes normal operation when no alerts are generated and ceases normal operation when at least one alert is generated.

17. The system of claim 9, wherein the controller generates the alert using one or more of an audible alarm, a visual alarm, and an electronic error message.

* * * * *